United States Patent [19]
Lundgren

[11] 3,792,515
[45] Feb. 19, 1974

[54] SINGLE-FACED CUTTING INSERT

[75] Inventor: Evert Gustav Lundgren, Sandviken, Sweden

[73] Assignee: Sandvikens Jernverks Aktiebolag, Sandviken, Sweden

[22] Filed: Oct. 18, 1972

[21] Appl. No.: 299,335

[30] Foreign Application Priority Data
Oct. 27, 1971 Sweden.............................. 13606/71

[52] U.S. Cl. .................................................. 29/95
[51] Int. Cl. ............................................ B26d 1/00
[58] Field of Search ...................... 29/95, 96, 97, 98

[56] References Cited
UNITED STATES PATENTS
3,399,442 9/1968 Jones et al. ............................ 29/95
3,383,748 5/1968 Galimberti ............................. 29/95
1,838,520 12/1931 Archer ................................... 29/98

Primary Examiner—Harrison L. Hinson
Attorney, Agent, or Firm—Pierce, Scheffler & Parker

[57] ABSTRACT

The cutting insert of the invention is characterized in that the cutting edge and the associated chip-breaker describe a curve composed of straight and/or arched parts in the plane of the clearance — or side face. The chip-breaker,— which can have one or more steps,— is so formed that its back or inner boundary or edge connects with a central part of the cutting insert. An important feature of the new cutting insert consists in that its chipbreaker has constant width and constant depth in relation to the cutting edge.

6 Claims, 34 Drawing Figures

PATENTED FEB 19 1974 3,792,515

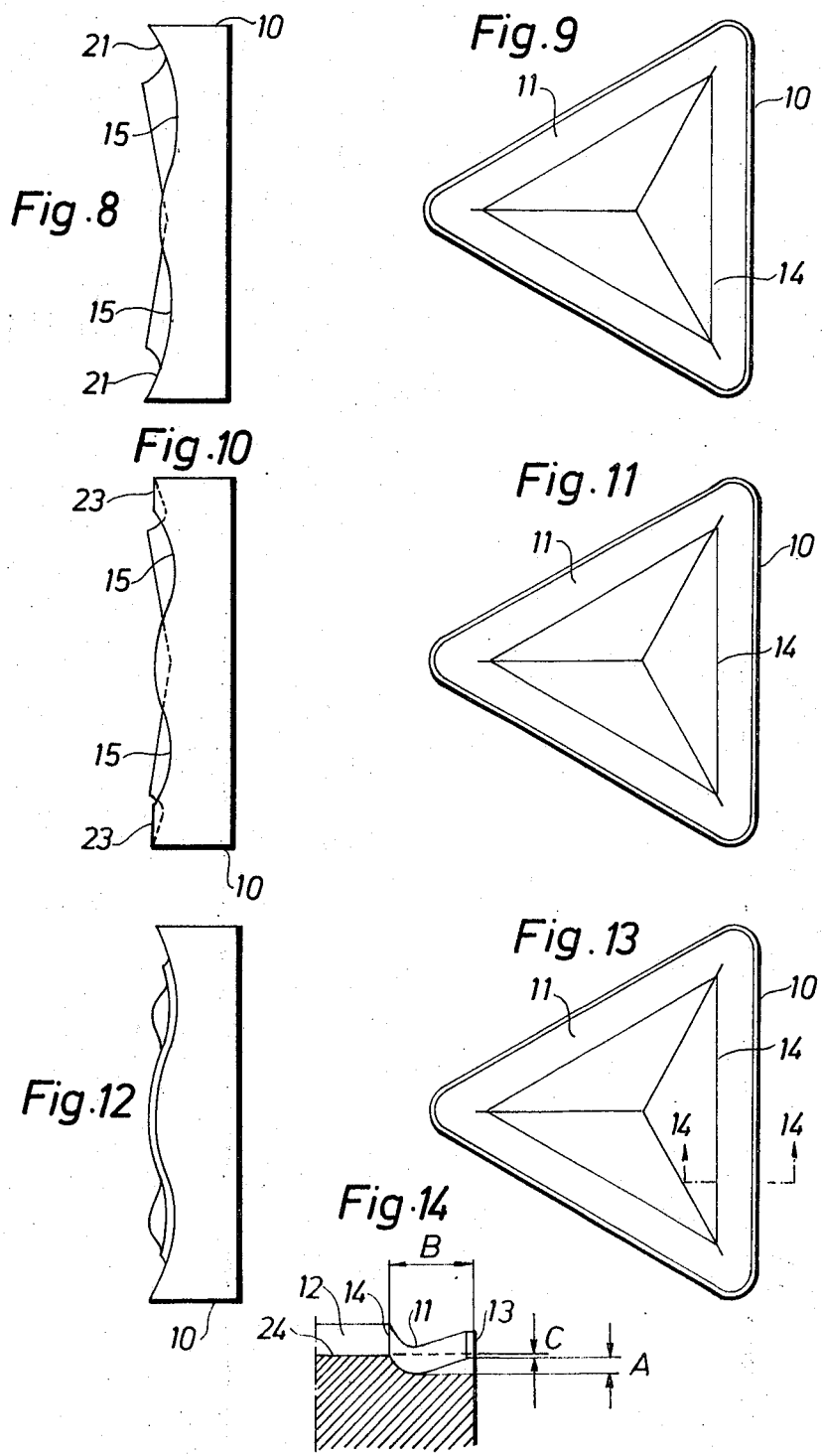

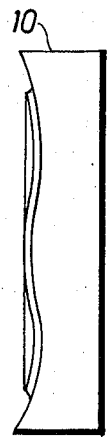
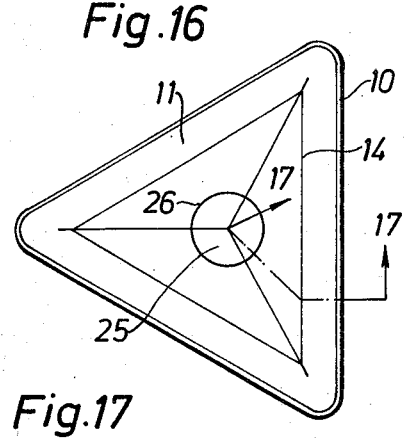
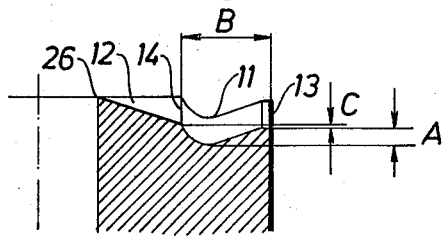
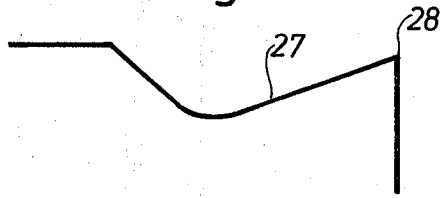
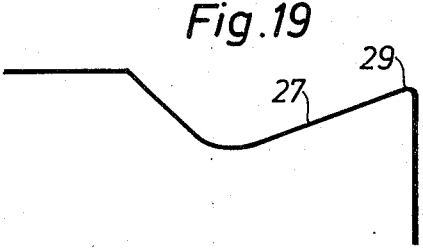
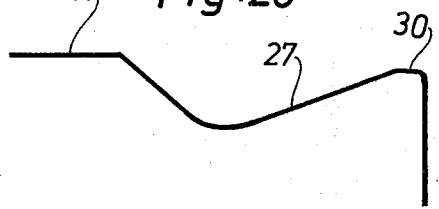
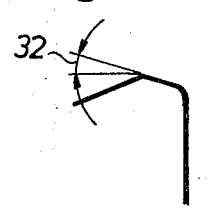

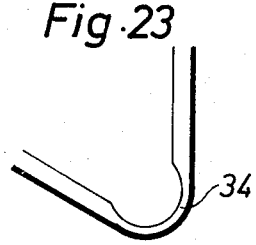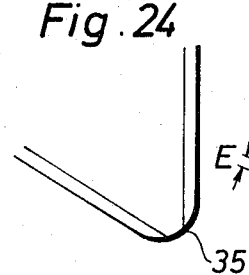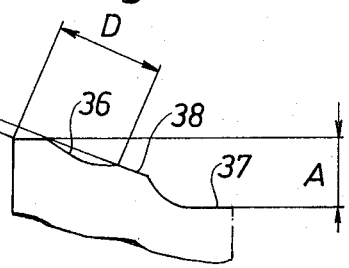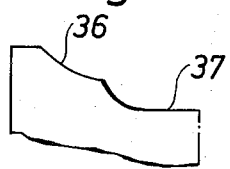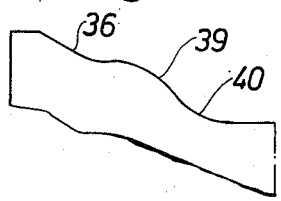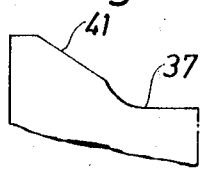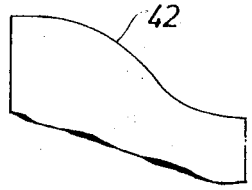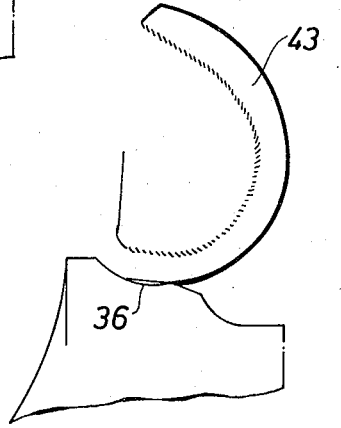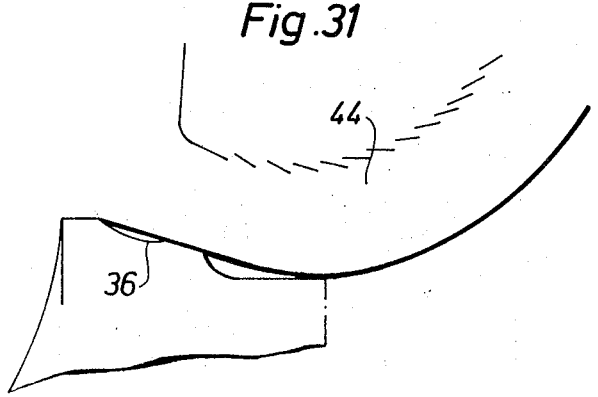

SINGLE-FACED CUTTING INSERT

The present invention relates to cutting inserts for chipforming machining and, in particular, to indexable inserts having at least one cutting edge. The inserts may have triangular, square, rhombic, rhomboidal or other form.

It heretofore was known to provide such inserts with grooves, or chipbreakers, in the broad sides or chip faces, such grooves extending along the cutting edges. Such chipbreakers could be shaped in one or more steps.

According to the present invention there is provided a cutting insert having improved chip-breaking and chip-forming functions compared to those of the earlier known inserts. The new cutting insert has also shown superior properties under most varying cutting conditions.

The cutting insert of the invention is characterized in that the cutting edge and the associated chip-breaker describe a curve composed of straight and/or arched parts in the plane of the clearance — or side face. The chip-breaker,— which can have one or more steps,— is so formed that its back or inner boundary or edge connects with a central part of the cutting insert. An important feature of the new cutting insert consists in that its chipbreaker has a constant width and constant depth in relation to the cutting edge.

The previously-mentioned central part of the cutting insert is so shaped that the inner edge of the chip-breaker, i.e., the cross-line between the central part and the chipbreaker, follows the form of the cutting edge and has a certain constant level in relation to the cutting edge. In the very corner or nose-radius region there may, however, be some divergence from this characteristic.

The invention is mainly limited to single-faced, positive or negative rake, indexable cutting inserts, i.e., inserts having cutting edges on only one broad side or the top side.

In the following the invention will be more specifically described in connection with the appended drawing in which:

FIGS. 4–11 are side elevation views, respectively horizontal projection views, of different embodiments of cutting inserts according to the invention;

FIGS. 12–14 are side elevation views, horizontal projection views, and profile views, respectively of chipbreakers of embodiments of cutting inserts according to the invention;

FIGS. 15–17 are side elevation views, horizontal projection views respectively profile views of chipbreaker in embodiment of cutting inserts according to the invention;

FIGS. 18–22 show different forms of the connection between chipbreaker and cutting edge;

FIGS. 23–24 are bottom views of different embodiments of insert corners according to the invention;

FIGS. 25–31 show profiles of chipbreaker and connecting central insert face.

Figure 1:
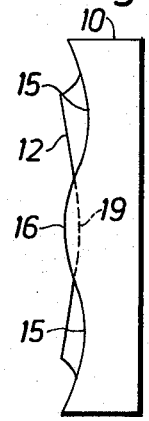
FIG. 1 is a side elevation view of the insert in FIG. 2.

According to FIGS. 1–34, the cutting inserts 10 have on one broad side or the top side at least one corner with one or two connecting cutting edges. Along the cutting edges there are chipbreakers in the form of grooves 11 surrounding a central area 12 of the cutting insert. As has earlier been mentioned, the cutting edge is formed so that it describes a curve composed of straight and/or arched parts in the plane of the clearance or side face. The chipbreaker 11 has constant width B and a constant depth A in relation to the cutting edge 13 (see FIGS. 3, 14 respectively 17).

The last-mentioned figures (FIGS. 3, 14, 17) also illustrate how the inner edge 14 of the chipbreaker has a certain constant level C in relation to the cutting edge.

Figure 2:
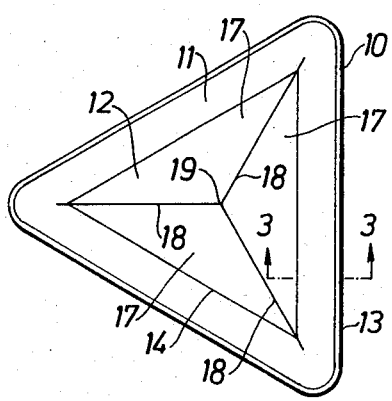
FIG. 2 is a horizontal projection view of a cutting insert according to the invention, showing the top side thereof.
Figure 3:
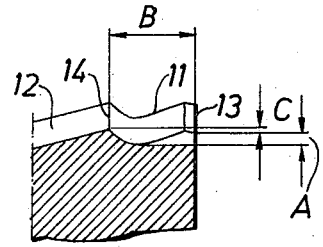
FIG. 3 is a profile view on an enlarge scale of the chipbreaker and associated central insert face, taken on section line 3—3 of FIG. 2.

In the embodiment shown in FIGS. 1 and 2, the cutting edge consists of two concave parts 15 immediately adjacent the corner radii of the cutting insert and an interjacent convex part 16. The central region consists of three bending, equally formed, faces 17 each of which follows the form of the associated cutting edge and is limited by the bisectrix 18 from the insert corner into the center 19 of the cutting insert.

Figure 4:
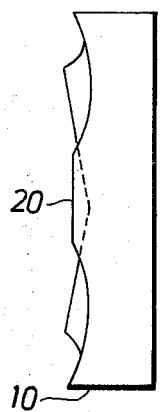
Figure 5:
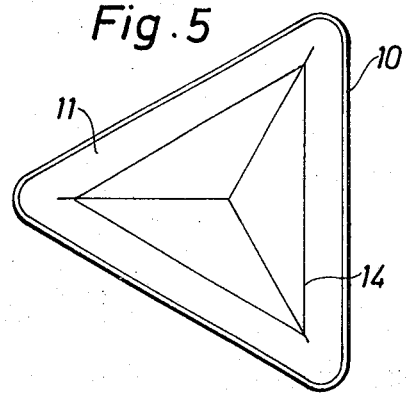

According to the embodiment shown in FIGS. 4 and 5 the interjacent portion 20 of the cutting edge is straight.

Figure 6:
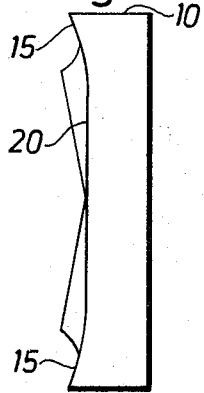
Figure 7:
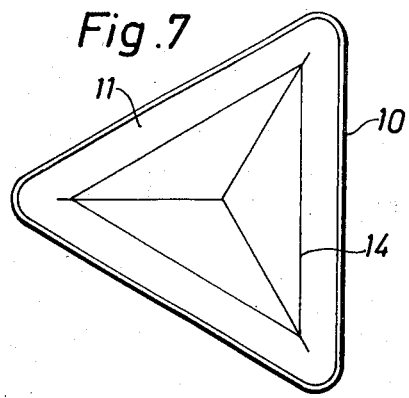

FIGS. 6 and 7 show an embodiment in which the interjacent straight part 20 connects with, and touches, the adjacent concave parts 15 at their lowest point.

FIGS. 8 and 9 show an embodiment in which the outer portion 21 of the concave parts 15 is straight toward the insert corners.

FIGS. 10 and 11 show an embodiment in which the downward parts 15 of the cutting edge do not start at the insert corners but rather they start at some distance 23 into the cutting edge per se. This form may be present in all embodiments mentioned.

FIGS. 12–14 represent another embodiment in which the intersection 14 between the back (or inner) edge of the chipbreaker and the central face follows the form of the cutting edge and has constant level C in relation to the cutting edge, but in this embodiment all the cross sections 24 through the central face are parallel with the bottom side of the cutting insert.

FIGS. 15–17 illustrate a cutting insert having a central hole 25 for securing the cutting insert in a tool holder. Like earlier embodiments, the intersection 14 of the central part and the back edge has a varying height in relation to the bottom face of the cutting insert. Because the different parts of the central face have been given different inclination to the center of the cutting insert, all parts of the connection line 26 between the central face and the central hole have the same level above the bottom side of the cutting insert.

Examples of the connection between chipbreaker and cutting edge are shown in FIGS. 18–22. Thus, the front edge 27 of the chipbreaker may connect directly with the cutting edge 28, 29 which may be sharp,— see FIG. 18, or slightly rounded, see FIG. 19. It may also be connected with the cutting edge via a plain face or land area 30. This plain face may be parallel with the top face 31 respectively bottom face of the cutting insert, or it may incline in negative angle 32 or positive angle 33.

As shown in FIGS. 23–24, the above-mentioned plain face may be thinner in the region 34 around the nose radius, or be completely missing in this area 25.

The central area of the cutting insert may be so formed that the intersection with the chipbreaker has a certain constant depth below, or "negative" level in relation to, the cutting edge. This is illustrated in FIGS. 25–31, which show different embodiments of chipbreakers having this characteristic.

The recessed central part of the cutting insert, which often consists of bending faces but may be composed of plain faces, corresponds to a second chipbreaker step. Here the transition between the proper chipbreaker and the central part is continuous, and the depth A corresponds to the depth C. These distances (A, respectively C) in relation to the cutting edge depend upon the intended chip thickness. Thus, an insert meant for large chip-thickness shall have a greater distance A than an inert meant for smaller chip thickness.

In FIG. 25 there is shown a chipbreaker having a first chipbreaker step 36. The width D and depth E of this step shall be adapted to the least chip thickness for which the insert is intended. At smaller dimensions, the insert breaks the chips at smaller chip thickness. Between the first chipbreaker step 36 and the second step 37 the insert may have a plain part 38. The transition surface between the steps may also be formed without this part (see FIG. 26), or it consists of two curving faces 39 respectively 40 (see FIG. 27). In inserts intended for large chip thickness, where the chip is self-breaking, the first chipbreaker step may be omitted, the corresponding part 41 of the chip face being straight (see FIG. 28).

FIG. 29 shows an embodiment wherein the form appears to resemble that in FIG. 27, but it lacks the first chipbreaker step 36. Because of the convex form of the chip face 42, this cutting insert has an increasing positive back-rake angle along the chip face, which condition is favorable from aspects of edge strength as well as chipbreaking. Because the back-rake angle is small in the area near the cutting edge, a chip having small thickness will get a heavy initial bend, which facilitates the chipbreaking. At increased chip thickness, the contact length of the chip against the chip face increases and the chip will lie close further down to the convex chip face. The back-rake angle is, then, more positive and the initial bend of the chip is smaller, which circumstance makes the chip breaking not too hard.

FIG. 30 illustrates how the first chipbreaker step 36 breaks the chip 37 at small chip thickness. At increased thickness of the chip, the chip 38 will to a great extent pass the first step and go down in the second chipbreaker step (see FIG. 31). For tough materials which get small initial bend, the chip will in certain cases go down to the bottom of the second step and be broken against this step. The shown embodiment of the second chipbreaker step gives softer chip breaking at large chip thickness compared to earlier used forms.

Figure 32:
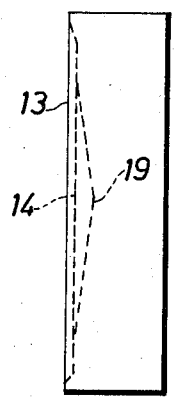
FIGS. 32–34 are side elevation views, respectively horizontal projection views, of embodiments of cutting inserts according to the invention.
Figure 33:
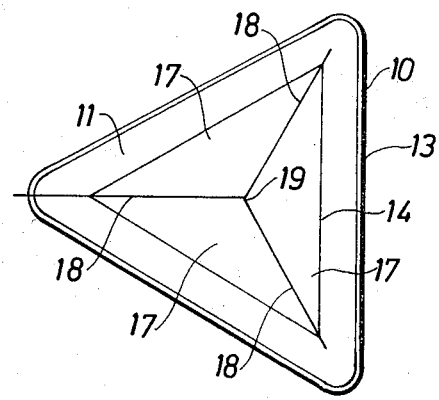
Figure 34:
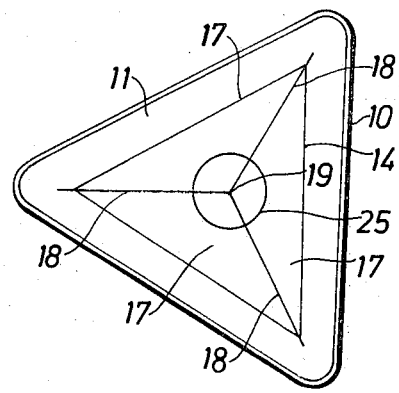

FIGS. 32–34 show additional embodiments of cutting inserts according to the invention, in which the cutting edge 13 is straight and parallel with the bottom face. The inner boundary or edge 14 of the chipbreaker 11,— said boundary following the shape of the cutting edge,— is also straight and parallel with the bottom face. In the case shown, the inner edge of the chipbreaker is somewhat below the cutting edge. The central region of the cutting insert consists of three equally shaped faces 17, which faces are plain i.e., each follows the form of the associated cutting edge and chipbreaker. The faces 17 are limited by the bisectrix 18 from the insert corners into the center 19 of the insert. The faces slope downwards i.e., towards the bottom face of the insert in the direction of the center 19 of the insert. FIG. 34 shows a cutting insert having a central hole 25 for clamping by means of a pin or equivalent (not shown), while the embodiment according to FIGS. 32 and 33 has no central hole. By the last shown embodiment of the central region of the insert, several improvements are obtained. Thus, the deformation of the chips is less, and also the cutting forces. At the same time, there are less vibrations in the cutting insert and less heat evolution, which in its turn reduces the wear.

I claim:

1. Cutting insert of regular polygonal form having broad top and bottom surfaces with interconnecting side faces and having at least one cutting edge (13) at the intersection of one of said faces with said broad top surface, said cutting edge being provided with a chipbreaker in the form of a groove (11) in said broad side or chip face of the insert, said groove extending along the cutting edge, the inner or back boundary (14) or edge of the chipbreaker connecting with a central region (12) on the plane surface of the face of the insert, in which cutting insert the cutting edge with connecting chipbreaker describes a curve composed of straight and/or arched parts (15, 16, 20, 21) in the plane of the clearance or side face, the chipbreaker having principally constant depth and width in relation to the cutting edge, and said central region (12) being so shaped that its intersection with the inner edge (14) of the chipbreaker follows the form of the cutting edge and has a certain constant level in relation to the cutting edge.

2. Cutting insert according to claim 1, wherein the cutting edge and connecting chipbreaker consist of concave parts (15) next to the corner radii of the insert and an interjacent convex part (16).

3. Cutting insert according to claim 1, wherein the cutting edge and connecting chip face consist of concave parts (15) next to the corner radii of the insert and an interjacent plain part (20).

4. Cutting insert according to claim 1, wherein the outer portion (21) of the concave parts (15) is straight.

5. Cutting insert according to claim 1, wherein the downward part (15) of the cutting edge starts at some distance (23) into the cutting edge as seen from the corner of the insert.

6. Cutting insert according to claim 1, wherein the profile of the chipbreaker perpendicular to the cutting edge is shaped with at least one convex part.

* * * * *

UNITED STATES PATENT OFFICE
CERTIFICATE OF CORRECTION

Patent No. 3,792,515                        Dated February 19, 1974

Inventor(s)    Evert Gustav Lundgren

It is certified that error appears in the above-identified patent and that said Letters Patent are hereby corrected as shown below:

[73]        Assignee:        Sandvik Aktiebolag,
                             Sandviken, Sweden Signed and sealed this 2nd day of July 1974.

(SEAL)
Attest:

EDWARD M. FLETCHER,JR.                C.MARSHALL DANN
Attesting Officer                     Commissioner of Patents